United States Patent

Rohde

[11] Patent Number: 5,575,262
[45] Date of Patent: Nov. 19, 1996

[54] DAMPER ELEMENT FOR DAMPING COMPRESSIVE OSCILLATIONS AND METHOD FOR PRODUCING THE SAME

[75] Inventor: Siegfried Rohde, Kohoku, Japan

[73] Assignee: Robert Bosch GmbH, Stuttgart, Germany

[21] Appl. No.: 340,689

[22] Filed: Nov. 16, 1994

[30] Foreign Application Priority Data

Dec. 4, 1993 [DE] Germany ............... 43 41 368.4

[51] Int. Cl.$^6$ ................................. F02M 37/04
[52] U.S. Cl. ............... 123/467; 123/470; 123/456; 138/28
[58] Field of Search ................ 123/456, 467, 123/468, 469, 470, 447; 138/26, 27, 28, 30

[56] References Cited

U.S. PATENT DOCUMENTS

| | | | |
|---|---|---|---|
| 3,677,299 | 7/1972 | Cibie | 138/28 |
| 4,056,679 | 11/1977 | Brandt | 138/28 |
| 4,295,452 | 10/1981 | Lembke | 123/469 |
| 4,437,443 | 3/1984 | Hofbauer | 123/467 |
| 4,615,320 | 10/1986 | Fehrenbach | 123/467 |
| 4,649,884 | 3/1987 | Tuckey | 123/470 |
| 4,660,524 | 4/1987 | Bertsch et al. | |
| 4,729,360 | 3/1988 | Fehrenbach | 123/467 |
| 5,056,489 | 10/1991 | Lorraine | 123/468 |

FOREIGN PATENT DOCUMENTS

| | | | |
|---|---|---|---|
| 1369188 | 12/1964 | France | 138/30 |
| 3103147C2 | 8/1982 | Germany . | |
| 3432727A1 | 11/1985 | Germany . | |
| 561973 | 5/1957 | Italy | 123/467 |
| 61-59188 | 6/1994 | Japan | 123/468 |
| 25186 | 5/1932 | Netherlands | 138/28 |

*Primary Examiner*—Carl S. Miller
*Attorney, Agent, or Firm*—Kenyon & Kenyon

[57] ABSTRACT

A damper element for damping compressive oscillations in the fuel circulation circuit of an internal combustion engine is situated directly in the fuel distributor. The damper element includes one or more gas-filled chambers and is manufactured from a resilient material. A bubble-type flexible cord can be used as a damper element. Because of its very simple structure and small mass, the damper element can be integrated in the fuel distributor so that no additional space is required. The damping of the compressive oscillations induced by the switching pulses of the injection valves takes place in the immediate vicinity of each individual injection valve.

21 Claims, 3 Drawing Sheets

DAMPER ELEMENT FOR DAMPING COMPRESSIVE OSCILLATIONS AND METHOD FOR PRODUCING THE SAME

FIELD OF THE INVENTION

The present invention relates to a damper element for damping compressive oscillations. More particularly, the present invention relates to a damper element for damping compressive oscillations in a fuel circulation circuit of an internal combustion engine.

BACKGROUND OF THE INVENTION

German Patent Application No. DE 31 03 147 describes a damper element, which, as an additional component part, is in communication with pressurized fuel of a fuel injection system in order to smooth out and reduce compressive oscillations. As a damping member, this damper element has an elastic fabric membrane which is clamped between a base part and a cover. In the case of a longer operation, the damper element loses its damping effect as fuel diffuses into an unventilated damper space.

Numerous types of damper elements require additional installation space because they are designed separately from the fuel distributor. These damper elements pose an additional safety risk when leakage occurs and when damage is caused, for example, by accidents involving vehicles containing such fuel-injection systems.

Furthermore, fuel-supply lines, such as described in German Patent Application No. DE 34 32 727, are designed to have at least one oscillatory, elastic inner wall part. Given adequate stability of the entire fuel-supply line, this guarantees that pressure pulsations occurring in the fuel are damped by the elastic inner wall part, so that noises are avoided. These solutions are costly and pose an additional safety risk because they entail large areas to be sealed off to the outside. Moreover, the damping action is not optimal, since the oscillatory, elastic inner wall must be rigid and stable enough to guarantee the imperviousness of the system. Inevitably, this requirement adversely affects the damping action.

SUMMARY OF THE INVENTION

The damper elements according to the present invention have the advantage of being arranged as especially cost-effective elements with a very simple construction and low mass in the fuel distributor or in the injection valves. Thus, no additional space is required on the internal-combustion engine, and the damping of the compressive oscillations induced by the switching pulses of the injection valves takes place in the immediate vicinity of each individual injection valve. In this manner, the present invention reduces the mutual influence of the quantity of fuel to be injected for the individual valves.

It is especially advantageous for a bubble-type or bladder or bag-type flexible cord to be used as a damper element, which is directly situated with its gas-filled chambers in the fuel distributor and either floats there freely or is affixed by attaching means to the inner wall of the fuel distributor. When no attaching means are provided for fixing the bubble-type flexible cord to the fuel distributor, it is beneficial to arrange spacer elements on the injection valves or on the inner wall of the fuel distributor. This ensures that a minimum distance is retained between the bubble-type flexible cord and the mounts for the injection valves, through which the fuel flows from the fuel distributor to the injection valve, so that the bubble-type flexible cord cannot close the mounts. It is advantageous to use wire straps as spacer elements, which are secured, for example, in a groove of the injection valve or directly on the fuel filter of the injection valve.

Moreover, it is advantageous to introduce one or more ray-shaped collars in the fuel distributor to extend radially over the entire flow cross-section of the fuel distributor. The ray-shaped collar surrounds the bubble-type flexible cord in the area of connecting elements between the gas-filled chambers with an inner ring, to allow the bubble-type flexible cord to be retained here as well in a substantially defined position.

In addition, it is advantageous to design the damper element as a double-bubble element and to secure it by a retaining clamp directly to the fuel filter of the injection valve. This configuration achieves an especially effective damping action due to the direct proximity to the source of the compressive oscillations.

The damper elements can be advantageously manufactured from a resilient material, such as rubber, plastic or a gas-tight fabric.

Compared to known damper elements, the damper elements according to the present invention do not have any sealing surface facing the outside and they also do not form any outer wall for the fuel system. Should the damper element according to the present invention fail, for example, due to an accident, the safety and reliability of the fuel system would in no way be adversely affected.

DETAILED DESCRIPTION OF THE INVENTION

A damper element 1 according to the present invention provides for damping compressive oscillations of a flow discharge medium, preferably for damping pressure pulsations in a fuel circulation circuit. In particular, the damper element according to the present invention provides for damping compressive oscillations in fuel-distributor devices 2 of internal combustion engines having fuel injection through injection valves 3.

Figure 1:
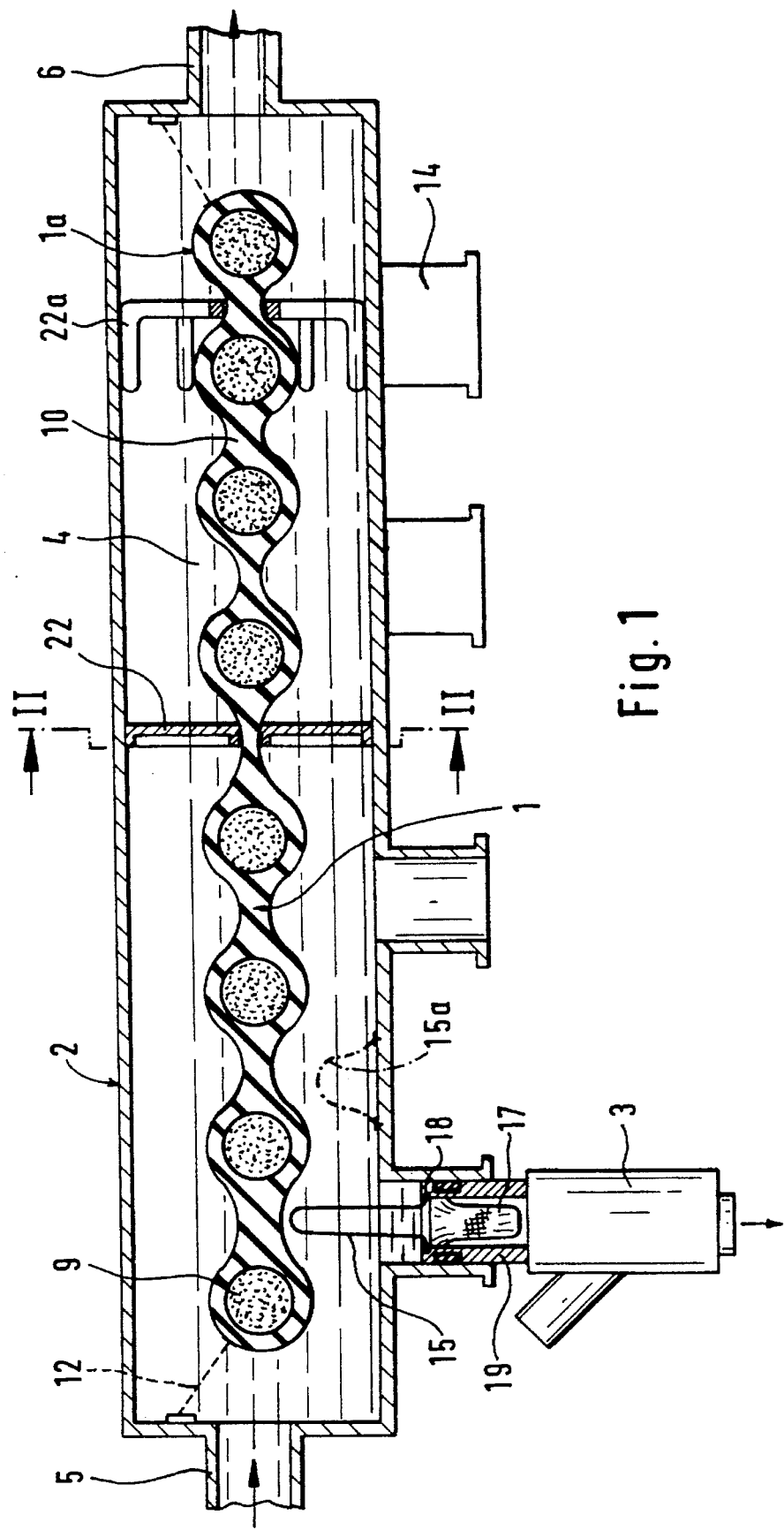
FIG. 1 shows a fuel distributor in the longitudinal direction with an integrated damper element according to the present invention.

FIG. 1 shows a simplified and schematic representation of a fuel distributor 2 of a fuel-injection system of, for example, mixture-compressing internal-combustion engines having externally supplied ignition. Fuel 4 flows in a generally known way into one end 5 of the fuel distributor 2, which serves to distribute the fuel 4 among the injection valves 3, and emerges at the opposite end 6 of the fuel distributor 2 at a pressure regulator or as backflow.

As a first exemplary embodiment, the damper element 1 according to the present invention is arranged in the form of a bubble-type flexible cord 1a inside the fuel distributor 2. The damper element 1 is made up of one or more gas-filled, balloon-like chambers 9, for example up to fifteen chambers 9, which follow one behind the other. In the case of configurations having more than one chamber 9, connecting elements 10 are provided between the gas-filled chambers 9. Materials suited for the damper element 1 can be both resilient rubber or plastics, as well as coated fabrics, which, of course, must be gas-tight.

The damper element 1 designed as a bubble-type flexible cord 1a extends, for example, nearly over the entire length of the inside of the fuel distributor 2. The bubble-type flexible cord 1a floats in the flow of the fuel 4. The chambers 9 are, in fact, lined up one behind the other by the connecting elements 10 so as to form the bubble-type flexible cord 1a and thus, together, make up the damper element 1. However, there can be no exchange of gas among the chambers 9.

The bubble-type flexible cord 1a can be freely floating in the fuel distributor 2 and thus without any attachment of the damper element 1 to the inner walls of the fuel distributor 2 surrounding the damper element 1. The bubble-type flexible cord 1a also can be provided with attaching means 12 (shown with a dotted line in FIG. 1) to affix them to the fuel distributor 2. Attaching means 12 can be, for example, elastic threads which are attached in grooves or to lugs of the bubble-type flexible cord 1a or to the inner wall of the fuel distributor 2.

On its longitudinal side, the fuel distributor 2 depicted schematically in FIG. 1 has supporting mounts 14 for each injection valve 3. Depicted by way of example is an injection valve 3, which is inserted in one mount 14 and can be secured using clamps (not shown) to the mount 14. Injection valves 3 can likewise be inserted in the other mounts 14, there being widely varying possibilities for fixing the injection valves 3 to the mounts 14 of the fuel distributor 2.

Thus, the bubble-type flexible cord 1a, as damper element 1, is situated inside the fuel distributor 2 and, consequently, in the immediate vicinity of the mounts 14 for the injection valves 3. The compressive oscillations induced by the switching pulses of the injection valves 3 are damped quite advantageously in the immediate vicinity of each injection valve 3. The gas volume of the damper element 1 will vary in response to the temperature of the fuel 4 and the system pressure.

The design and configuration of the damper element 1 according to the present invention achieves an effective damping of the pressure pulsations of the fuel 4 in the system. The pressure pulsations would otherwise, on the one hand, lead to an unwanted mutual influencing of the injection volumes of the individual injection valves 3 and, on the other hand, contribute to noise emission from the injection valves 3. Moreover, the arrangement of the damper element 1 according to the present invention offers improved properties with respect to reliability and safety for protecting against leakage.

Compared to known damper elements, the damper element according to the present invention does not have any sealing surface facing the outside and also does not form any outer wall for the fuel system, in contrast to fuel-supply lines having elastic inner walls. Any destruction to a chamber 9 resulting from friction or the like would in no way pose a safety risk and also would not jeopardize the functions of the fuel distributor 2 and the bubble-type flexible cord 1a. Rather, the damping effect would be reduced accordingly by a small percentage.

To prevent the mounts 14, through which the fuel 4 from the fuel distributor 2 attains the injection valves 3, from closing when the bubble-type flexible cord 1a is put on, it is expedient for spacer elements to be provided. In the simplest case, the spacer elements can be wire straps 15 which project out of the mounts 14 into the fuel distributor 2. As FIG. 1 depicts, the wire strap 15 serving as a spacer element in the injection valve 3 can be arranged, for example, upstream from a fuel filter 17. The wire strap 15 is introduced for this purpose, for example, in a groove 18 on the intake nipple 19 of the injection valve 3. The bubble-type flexible cord 1a can only sink so far in the direction of the mounts 14 and the injection valves 3 until, for example, the two or four wire straps 15 projecting into the fuel distributor 2 are contacted. Thus, any clogging of the mounts 14 is prevented.

Besides securing the spacer element 15 directly to the injection valve 3, there are other possibilities for maintaining the clearance between the mounts 14 and the bubble-type flexible cord 1a. Thus, for example, ray-shaped collars 22, 22a can be arranged directly in the fuel distributor 2 or directly on the bubble-type flexible cord 1a.

Figure 2:
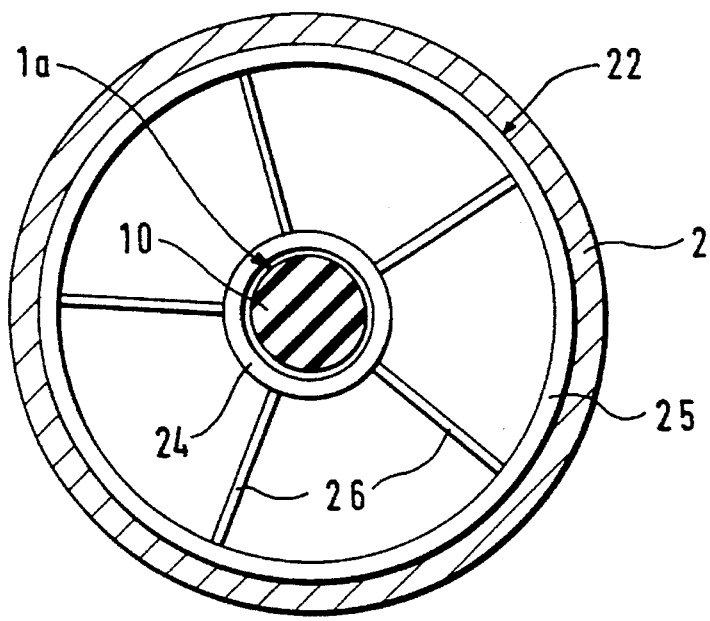
FIG. 2 depicts a section along the line II through the fuel distributor shown in FIG. 1.

One or more ray-shaped collars 22, 22a formed, for example, from plastic are introduced in the fuel distributor 2 so as to extend radially over the entire flow cross-section of the fuel distributor 2, and radially surround the bubble-type flexible cord 1a in the area of their connecting elements 10. Thus, the ray-shaped collars 22, 22a ensure that the bubble-type flexible cord 1a is positioned as a damper element 1 more or less in the longitudinal axis of the fuel distributor 2. Spacer elements can also be configured, for example, as wire straps 15a directly on the inner wall of the fuel distributor 2, as indicated by the dot-dash line. It is entirely sufficient to use one securing method at a time. FIG. 2 is a transverse representation through the fuel distributor 2 along a ray-shaped collar 22.

In all of the exemplary embodiments of the present invention, the feature resulting from the proximity of the damper element 1 to the injection valves 3, namely that no additional installation space is needed for the damper element, is especially advantageous.

FIG. 2 depicts how a ray-shaped collar 22 can be inserted in the fuel distributor 2 to prevent the mounts 14 of the injection valves 3 from closing as a result of the damper element 1. The ray-shaped collar 22 is manufactured, for example, from rubber or plastic and represents either a single component part or is also injection-molded on the bubble-type flexible cord 1a. The ray-shaped collar 22 is composed of an inner ring 24, an outer ring 25 and, for example, five radial braces 26 running equidistantly from one another between the inner ring 24 and the outer ring 25.

The diameter of the outer ring 25 is smaller in this case than the diameter of the inside of the fuel distributor 2, while the inner ring 24 has a larger diameter than the bubble-type flexible cord 1a in the area of its connecting elements 10. The number of ray-shaped collars 22 to be used on the fuel distributor 2 is dependent upon the material of the ray-shaped collars 22. Given soft material that is favorable to damping, more than three ray-shaped collars 22, for example, can be used; given harder material, only one or two ray-shaped collars 22, for example, can be used.

Figure 3:
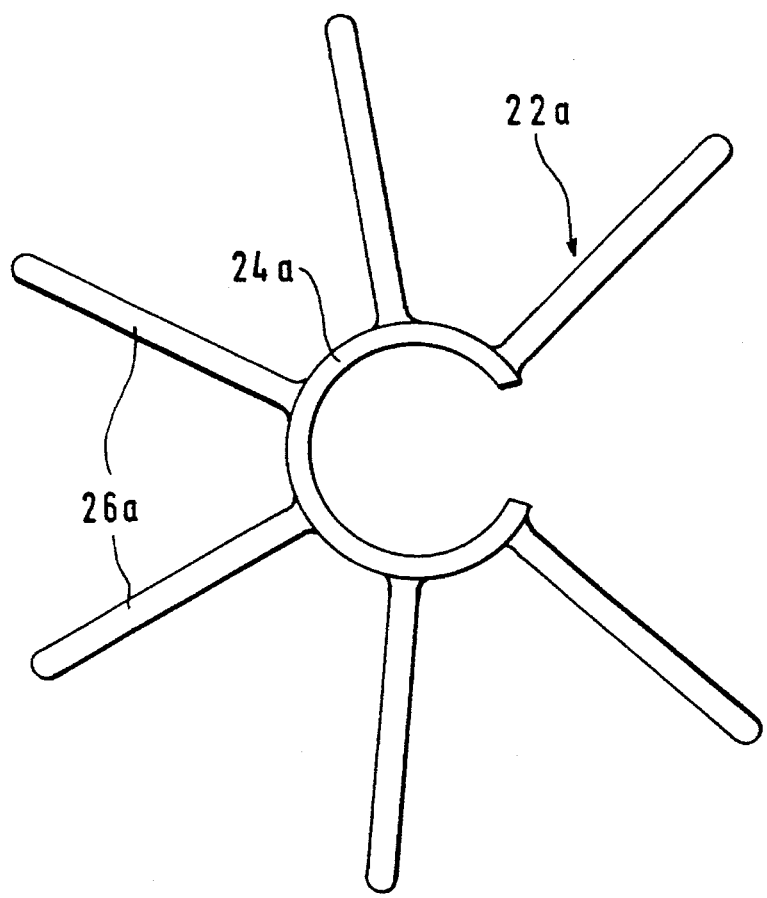
FIG. 3 illustrates a ray-shaped collar according to the present invention which can be installed in the fuel distributor shown in FIG. 1.

FIG. 3 illustrates another ray-shaped collar 22a, which is likewise used to prevent the damper element 1 from closing the mounts 14 of the fuel distributor 2 for the injection valves 3, and to ensure a positioning of the damper element 1 in the fuel distributor 2. The ray-shaped collar 22a is manufactured, for example, of rubber or of another resilient material and consists of an inner ring 24a and, for example, of six radial braces 26a, which radiate outward from the inner ring 24a and are spaced equidistantly from one another. The inner ring 24a is, for example, not formed over 360° and thus has an opening to considerably facilitate the introduction of the ray-shaped collar 22a in the fuel distributor 2 when placing it around the damper element 1. Since the ray-shaped collar 22a is flexible, it can adapt to the contour of the connecting elements 10 of the bubble-type flexible cord 1a. Because of its elasticity, in the installed state the inner ring 24a can take on a somewhat different form than in the initial state, for instance when the diameter of the inner ring 24a is smaller than the bubble-type flexible cord 1a in the area of its connecting elements 10.

The elastic radial braces 26a are clearly longer than the diameter of the inside of the fuel distributor 2. When the ray-shaped collar 22a is introduced into the fuel distributor 2, the radial braces 26a are elastically deformed at their unattached ends, as can be seen in FIG. 1. The ends of the radial braces 26a abut against the inner wall of the fuel distributor 2 and position the bubble-type flexible cord 1a approximately in the middle of the fuel distributor 2.

Figure 4:
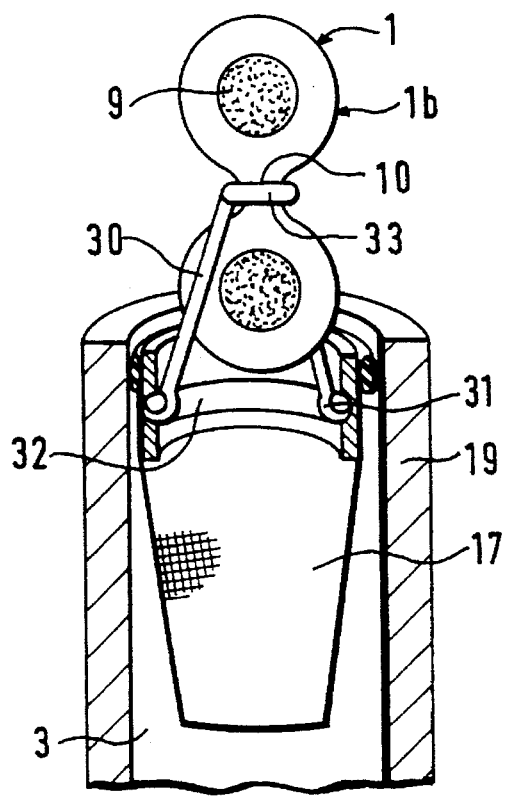
FIG. 4 shows a second exemplary embodiment of a damper element according to the present invention.
Figure 5:
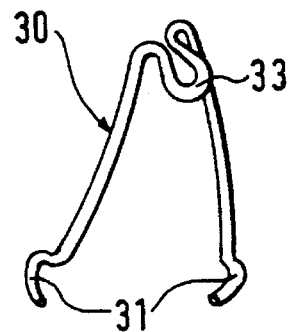
FIG. 5 depicts a retaining clamp for securing the damper element according to the present invention.

FIGS. 4 and 5 depict another exemplary embodiment of the present invention, in which the damper element 1 is situated directly on the injection valve 3. The damper element 1 in this embodiment is capable of forming one basic unit with the fuel filter 17. The fuel filter 17 is pressed into the intake nipple 19 of the injection valve 3. Arranging the damper element 1 in this manner produces an especially effective damping action because of its immediate proximity to the source of the compressive oscillations. In this exemplary embodiment of the present invention, the damper element 1 is designed as a double-bubble element 1b.

In FIG. 4, the gas-filled chambers 9 are made schematically visible. In the same way as the bubble-type flexible cord 1a, the double-bubble element 1b can include both resilient rubber or plastic as well as coated gas-tight fabric. A single bubble can also suffice as a damper element 1, but it is then more difficult to attach it to the injection valve 3. Designing the damper element 1 as a double-bubble element 1b with the connecting element 10 between the two chambers 9 allows it to be simply attached, for example, by means of a retaining clip 30 to the injection valve 3.

The retaining clip 30 shown in FIG. 5, which represents a bent wire, has snap-in clips 31 at both of its ends, which are able to lock into place in a filter groove 32 of the fuel filter 17 of the injection valve 3. The wire of the retaining clip 30 is bent so as to allow it, in the installed state, to extend out of the injection valve 3 in the direction of the fuel distributor 2. In the middle area of the wire of the retaining clip 30, a loop 33 is provided, which serves to clasp and retain the double-bubble element 1b in the area of the connecting element 10. This eliminates the possibility of the double-bubble element 1b slipping or even sliding into the injection valve 3.

The size of the damper element 1b is dependent upon the size and the shape of the inner space of the injection valve 3 and the mount 14. Therefore, for new developments, it is beneficial to adapt the injection valve 3 and the damper element 1b to one another.

Figure 6:
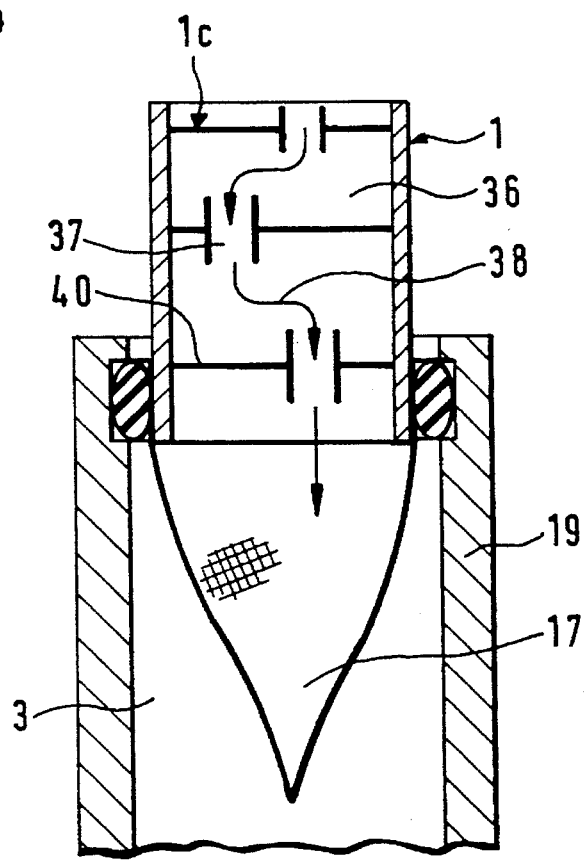
FIG. 6 shows a third exemplary embodiment of a damper element according to the present invention as a return (reverse-flow) damper.

FIG. 6 shows a schematic representation of a third exemplary embodiment of a damper element 1 according to the present invention in the form of a return (reverse-flow) damper 1c. In the same way as the double-bubble element 1b, the return (reverse-flow) damper 1c is directly attached to the injection valve 3 or to its fuel filter 17. Corresponding grooves or attachment means, both for the damper element 1, as well as for sealing rings for sealing off the return (reverse-flow) damper 1c at the injection valve 3 can be provided on the intake nipple 19 of the injection valve 3, as shown in FIG. 6.

The resonators contained in the return (reverse-flow) damper 1c make it possible for it to ensure a damping of the compressive oscillations of the fuel 4 induced by the switching pulses of the injection valves 3. The return (reverse-flow) damper 1c includes a plurality of chambers 36, which are interconnected by ports or conduits 37 serving as inlets and outlets. Each individual chamber 36 is delimited, on the one hand, by the outer wall of the return (reverse-flow) damper 1c and, on the other hand, by two transverse walls 40. The transverse walls 40 of the chambers 36 contain the ports or conduits 37. The cross-section of the ports or conduits 37 in the transverse walls 40 runs at right angles to the direction of flow of the fuel 4 and is smaller than the cross-section of the chambers 36 and, consequently, of the entire return (reverse-flow) damper 1c.

The action of the return (reverse-flow) damper is based both on the reflection of the waves back to the source, as well as on the propagation of the waves, so that the damping effect is able to be improved as the result of interference. For this purpose, the ports or conduits 37 are preferably arranged so as to be radially displaced from one another. The damping is all the more effective when there are numerous reflecting points. The arrows 38 indicate the direction of flow of the fuel 4. Return (reverse-flow) dampers, along with the corresponding calculations for damping properties, are already known from other fields.

What is claimed is:

1. A method for damping compressive oscillations in a fuel circulation system of an internal combustion engine having a fuel distributor for supplying fuel to at least one fuel injection valve via at least one mount, comprising the step disposing at least one enclosed gas-filled chamber within the fuel distributor adjacent to the at least one fuel injection valve, the at least one chamber being surrounded by fuel contained in the fuel distributor.

2. A method for damping compressive oscillations in a fuel circulation system of an internal combustion engine having a fuel distributor for supplying fuel to at least one fuel injection valve via at least one mount, comprising the step of:

disposing at least one chamber within the fuel distributor adjacent to the at least one fuel injection valve, wherein the at least one chamber includes a plurality of gas-filled chambers, each of the plurality of gas-filled chambers being sealed to be gas-tight and being coupled to another of the plurality of gas-filled chambers via a connecting element, the coupled gas-filled chambers being included in a bubble-type flexible cord, the bubble-type flexible cord being composed of a resilient material, and wherein the step of disposing further includes disposing the bubble-type flexible cord within the fuel distributor.

3. The method according to claim 2, further comprising the step of attaching the bubble-type flexible cord to an inner wall of the fuel distributor.

4. The method according to claim 2, further comprising the step of maintaining a minimum clearance between the bubble-type flexible cord and the at least one mount via at least one spacer element.

5. The method according to claim 4, wherein the at least one spacer element includes a ray-shaped collar having an inner ring, an outer ring and at least one radial brace member extending radially between the inner ring and the outer ring.

6. The method according to claim 4, wherein the at least one spacer element includes a ray-shaped collar having an inner ring having a partially circular circumference and at least one radial brace member extending radially from the inner ring.

7. A method for damping compressive oscillations in a fuel circulation system of an internal combustion engine having a fuel distribution for supplying fuel to at least one fuel injection valve via at least one mount, comprising the steps of:

disposing at least one chamber within the fuel distributor adjacent to the at least one fuel injection valve, wherein the at least one chamber includes at least one gas-filled chamber which is sealed to be gas-tight, the at least one gas-filled chamber being included in a bubble element, the bubble element being composed of a resilient material; and disposing the bubble element adjacent to the at least one mount.

8. A method for damping compressive oscillations in a fuel circulation system of an internal combustion engine having a fuel distributor for supplying fuel to at least one fuel injection valve via at least mount, comprising the steps of:

disposing at least one chamber within the fuel distributor adjacent to the at least one fuel injection valve, wherein the at least one chamber includes two gas-filled chambers, each of the two gas-filled chambers being sealed to be gas-tight and being connected via a connecting element, the two connected gas-filled chambers being included in a double-bubble element, the double-bubble element being composed of a resilient material; and disposing the double-bubble element adjacent to the at least one mount.

9. A method for damping compressive oscillations in fuel circulation system of an internal combustion engine having a fuel distributor for supplying fuel to at least one fuel injection valve via at least one mount, comprising the step of:

disposing at least one chamber within the fuel distributor adjacent to the at least one fuel injection valve; and forming a return damper including the at least one chamber, wherein the at least one chamber is delimited by an outer wall and two transverse walls, each of the two transverse walls including an inlet/outlet element, each of the inlet/outlet portions having a cross-section which is at right angles to a flow of fuel and is smaller than a cross-section of the at least one chamber.

10. The method according to claim 9, further comprising the step of attaching the return damper to a fuel filter of the injection valve.

11. A damper element for damping compressive oscillations in a fuel circulation system of an internal combustion engine having a fuel distributor for supplying fuel to at least one fuel injection valve via at least one mount, the damper element comprising:

at least one gas-filled chamber, the at least one gas-filled chamber being sealed to be gas-tight;

a bubble-type flexible cord including the at least one gas-filled chamber, the bubble-type flexible cord being composed of a resilient material and disposed within the fuel distributor adjacent to the at least one fuel injection valve.

12. The damper element according to claim 11, wherein the at least one gas-filled chamber includes a first gas-filled chamber and a second gas-filled chamber, and further comprising a connecting element for coupling the first gas-filled chamber to the second gas-filled chamber, the bubble-type flexible cord further including the connecting element.

13. The damper element according to claim 11, wherein the resilient material includes at least one of a rubber, a plastic, and a gas-tight fabric.

14. The damper element according to claim 11, further comprising means for attaching the bubble-type flexible cord to an inner wall of the fuel distributor.

15. The damper element according to claim 11, further comprising at least one spacer element for maintaining a minimum clearance between the bubble-type flexible cord and the at least one mount.

16. The damper element according to claim 15, wherein the at least one spacer element includes a ray-shaped collar, the ray shaped collar having an inner ring, an outer ring and at least one radial brace member extending radially between the inner ring and the outer ring.

17. The damper element according to claim 15, wherein the at least one spacer element includes a ray-shaped collar, the ray shaped collar having an inner ring having a partially circular circumference and at least one radial brace member extending radially from the inner ring.

18. The damper element according to claim 11, wherein the bubble-type flexible cord is disposed adjacent to the at least one mount.

19. The damper element according to claim 18, wherein the bubble-type flexible cord includes a double-bubble element having two gas-filled chambers.

20. A damper element for damping compressive oscillations in a fuel circulation system of an internal combustion engine having a fuel distributor for supplying fuel to at least one fuel injection valve via at least one mount, the damper element comprising a return damper including at least one chamber, wherein the at least one chamber is delimited by an outer wall and two transverse walls, each of the two transverse walls including an inlet/outlet portion, each of the inlet/outlet portions having a cross-section which is at right angles to a flow of fuel and is smaller than a cross-section of the at least one chamber.

21. The damper element according to claim 20, wherein the return damper is attached to a fuel filter of the injection valve.

* * * * *